United States Patent
Choi

(10) Patent No.: US 8,803,373 B2
(45) Date of Patent: Aug. 12, 2014

(54) LINEAR VIBRATION MOTOR

(75) Inventor: Joon Choi, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 0 days.

(21) Appl. No.: 13/403,900

(22) Filed: Feb. 23, 2012

(65) Prior Publication Data

US 2013/0140918 A1 Jun. 6, 2013

(30) Foreign Application Priority Data

Dec. 5, 2011 (KR) .................. 10-2011-0129182

(51) Int. Cl.
*H02K 33/00* (2006.01)
(52) U.S. Cl.
USPC .......................................................... 310/25
(58) Field of Classification Search
USPC .......................................... 310/25, 14, 15, 36
See application file for complete search history.

(56) References Cited

U.S. PATENT DOCUMENTS

| | | | |
|---|---|---|---|
| 2011/0198949 A1* | 8/2011 | Furuich et al. ............... | 310/25 |
| 2011/0291497 A1* | 12/2011 | Choi ............................. | 310/25 |
| 2012/0169149 A1* | 7/2012 | Yoon et al. ................... | 310/25 |

FOREIGN PATENT DOCUMENTS

| | | | |
|---|---|---|---|
| KR | 10-2009-0066538 | * | 7/2009 |
| KR | 10-1055508 | | 8/2011 |

OTHER PUBLICATIONS

Machine translation for KR 10-2009-0066538 (Jan. 2, 2013).*
Office Action for related Korean Application No. 10-2011-0129182 dated Oct. 27, 2012, and its English translation.

* cited by examiner

*Primary Examiner* — Hanh Nguyen
(74) *Attorney, Agent, or Firm* — Ladas & Parry, LLP

(57) ABSTRACT

Disclosed herein is a linear vibration motor including: a stator part including a magnet; a vibrator part including a coil facing the magnet to generate electromagnetic force and a printed circuit board having one end coupled to the stator part and the other end coupled to the coil; and an elastic member connecting the stator part and the vibrator part to each other, wherein the stator part further includes a damper facing the vibrator part. The damper is made of a rubber material having lower density in order to alleviate and absorb impact at the time of contact with the vibrator part, thereby making is possible to prevent vibration noise due to residual vibration generated at the time of contact between the vibrator part and the stator part.

7 Claims, 2 Drawing Sheets

LINEAR VIBRATION MOTOR

CROSS REFERENCE TO RELATED APPLICATION

This application claims the benefit of Korean Patent Application No. 10-2011-0129182, filed on Dec. 5, 2011, entitled "Linear Vibration Motor", which is hereby incorporated by reference in its entirety into this application.

BACKGROUND OF THE INVENTION

1. Technical Field

The present invention relates to a linear vibration motor.

2. Description of the Related Art

A general linear vibration motor, which is a component converting electrical energy into mechanical vibration using a principle of generating electromagnetic force, is mounted in a mobile communication terminal, a portable terminal, and the like, to be used for silently notifying a user of call reception.

Currently, a linear vibration motor has been generally used as the vibration motor. The linear vibration motor is generally disposed at an edge portion of a device and generates vibration in a direction perpendicular to an object receiving the vibration.

In recent years, as the release of a mobile phone having a large liquid crystal display (LCD) screen has rapidly increased, a touch screen scheme has been adopted, such that a vibrating motor has been used in order to generate vibrations at the time of touch of the LCD screen. Performance particularly required in the vibration at the time of touch in the touch screen is as follows. First, as the number of vibration generation at the time of the touch becomes larger than that of vibration generation at the time of call reception, an operation lifespan time needs to increase. Second, in order to raise user's satisfaction when a user feels the vibration at the time of the touch, a response speed of the vibration needs to increase in accordance with a touch speed of the screen.

Therefore, the linear vibration motor according to the prior art is configured to include a stator part including a case, a bracket coupled to a lower portion of the case, and a magnet coupled to an inner side of the case; and a vibrator part including a coil interacting with the magnet to generate electromagnetic force and a printed circuit board applying external power to the coil.

However, in the case of the linear vibration motor according to the prior art described above, when the vibrator part is vertically driven in an internal space comparted by the case and the bracket, the vibrator part contacts the case or the bracket configuring the stator part, such that residual vibration is generated.

In addition, the vibrator part is damaged at the time of contact between the vibrator part and the stator part due to excessive linear vibration thereof as well as the residual vibration generated described above.

SUMMARY OF THE INVENTION

The present invention has been made in an effort to provide a linear vibration motor including a damper provided in a stator part facing a vibrator part in order to suppress generation of residual vibration and prevent a damage of the vibrator part at the time of contact between the vibrator part and the stator part.

According to a preferred embodiment of the present invention, there is provided a linear vibration motor including: a stator part including a magnet; a vibrator part including a coil facing the magnet to generate electromagnetic force and a printed circuit board having one end coupled to the stator part and the other end coupled to the coil; and an elastic member connecting the stator part and the vibrator part to each other, wherein the stator part further includes a damper facing the vibrator part.

The damper may be made of a rubber material having lower density in order to alleviate and absorb impact at the time of contact with the vibrator part.

The stator part may further include: a case having an internal space formed therein so as to cover the vibrator part; and a bracket coupled to a lower portion of the case and having an extension part coupled to one end of the printed circuit board, and the magnet may be coupled to an upper surface of an inner side of the case.

The damper may be coupled to an upper surface of an inner side of the bracket.

The damper may be coupled to the upper surface of the inner side of the case, and the magnet may be coupled to the upper surface of the inner side of the case while penetrating through a hollow hole formed in the damper.

The vibrator part may include: a yoke coupled to an outer peripheral surface of the coil; and a weight body provided with a hollow hole receiving the yoke and the coil therein to thereby be coupled to an outer peripheral surface of the yoke, and the coil may be coupled to the other end of the printed circuit board.

The printed circuit board may include: a coupling plate fixedly coupled to the stator part; an elastic part extended from the coupling plate in a spiral direction so as to have elastic force; and a contact part provided at one end of the elastic part and coupled to the coil of the vibrator part to apply external power to the coil.

The elastic member may include: an upper plate part fixedly coupled to an upper surface of an inner side of the stator part; a lower plate part fixedly coupled to an upper portion of the vibrator part; and a plurality of bending parts connecting the upper plate part and the lower plate part to each other and generating elastic force, and elastically support linear movement of the vibrator part.

The elastic member may be provided with a hollow part larger than an outer diameter of the magnet so that the magnet is positioned therein, since the elastic member elastically supports the linear vibration of the vibrator part.

DESCRIPTION OF THE PREFERRED EMBODIMENTS

Figure 1:
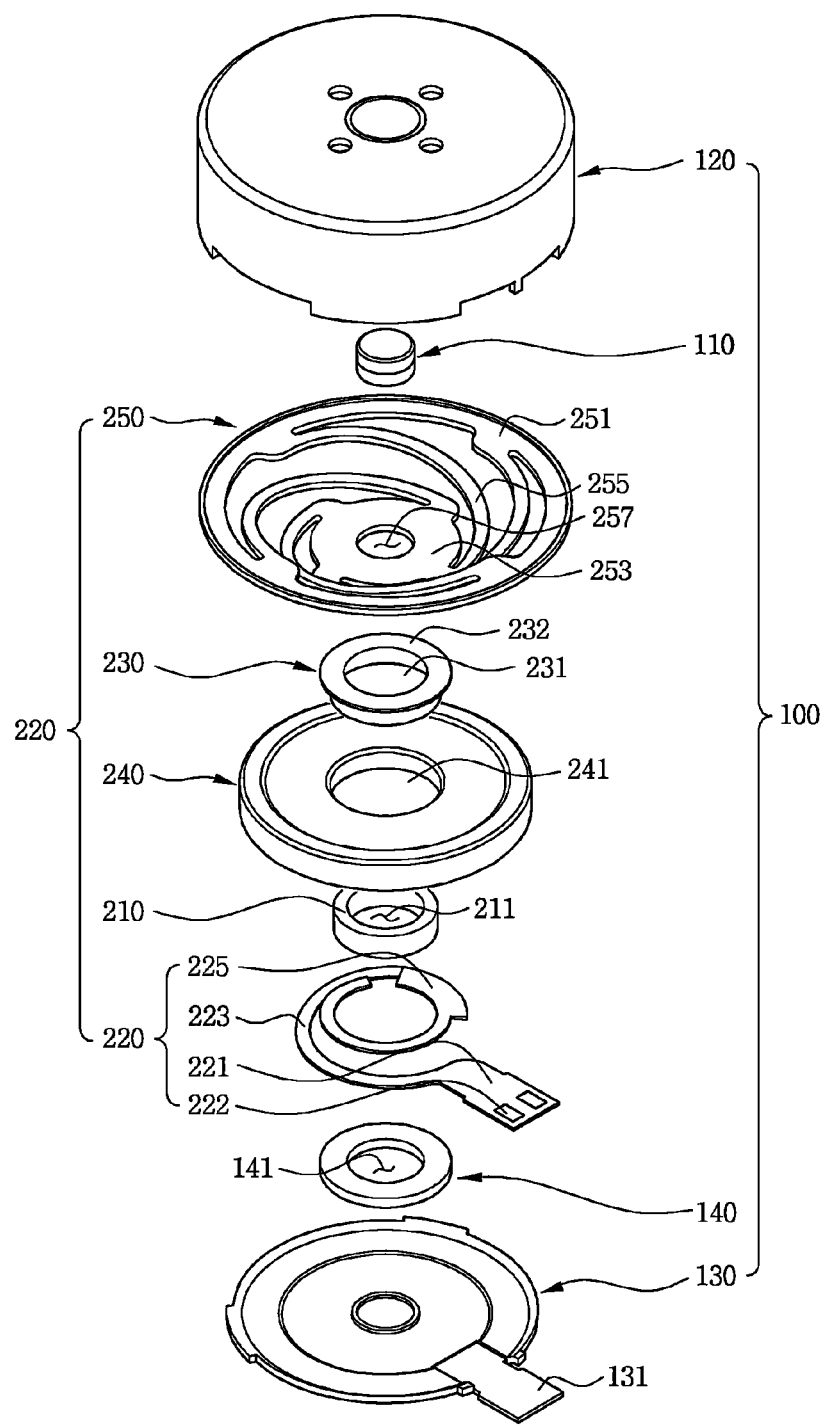
FIG. 1 is an exploded perspective view of a linear vibration motor according to a first preferred embodiment of the present invention.

Various objects, advantages and features of the invention will become apparent from the following description of embodiments with reference to the accompanying drawings. In the specification, in adding reference numerals to components throughout the drawings, it is to be noted that like reference numerals designate like components even though components are shown in different drawings. Further, terms used in the specification, 'first', 'second', etc. can be used to describe various components, but the components are not to be construed as being limited to the terms. The terms are only used to differentiate one component from other components. Further, when it is determined that the detailed description of the known art related to the present invention may obscure the gist of the present invention, the detailed description thereof will be omitted.

Hereinafter, preferred embodiments of the present invention will be described in detail with reference to the accompanying drawings.

<First Preferred Embodiment>

Figure 2:
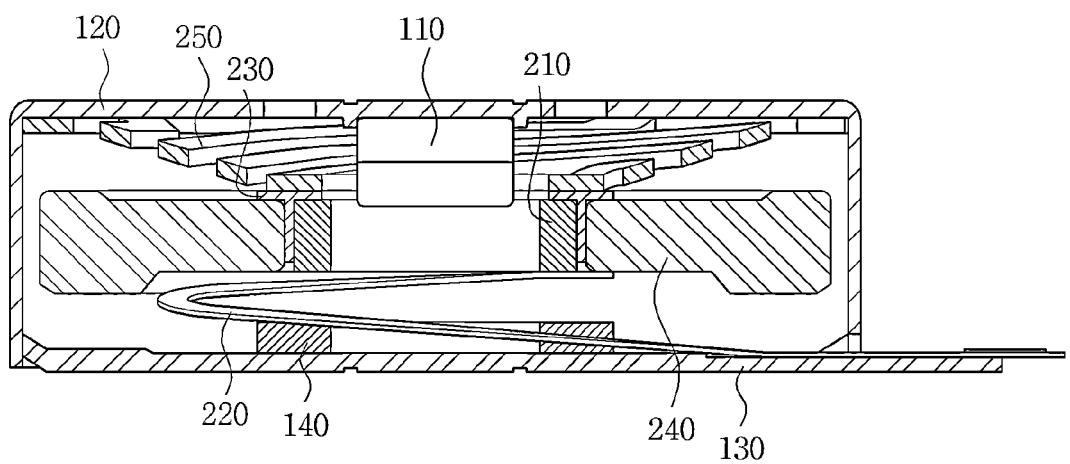
FIG. 2 is a cross-sectional view showing an assembled state of the linear vibration motor shown in FIG. 1.

FIG. 1 is an exploded perspective view showing a linear vibration motor according to a first preferred embodiment of the present invention; and FIG. 2 is a cross-sectional view showing an assembled state of the linear vibration motor shown in FIG. 1. As shown, the linear vibration motor includes a stator part 100 and a vibrator part 200.

More specifically, the stator part 100 includes a magnet 110, a case 120, a bracket 130, and a damper 140.

The magnet 110 is fixedly coupled to an upper surface of an inner side of the case 120, and the case 120 protects the vibrator part 200 from external impact and is provided with a predetermined internal space in which the vibrator part moves linearly.

The bracket 130 is coupled to a lower portion of the case 120 to compart the internal space in which the vibrator part 200 moves linearly.

In addition, the bracket 130 has an extension part 131 protruded in any direction to thereby be coupled to one end of a printed circuit board 220 to be described configuring the vibrator part 200.

As shown in FIGS. 1 and 2, according to the first preferred embodiment of the present invention, the damper 140 is fixedly coupled to an upper surface of an inner side of the bracket 120 so as to face the vibrator part 200.

More specifically, the damper 140 may be made of a rubber material having low density in order to alleviate and absorb impact at the time of contact with the vibrator part 200.

Therefore, in the case in which the vibrator part 200 contacts the upper surface of the inner side of the bracket 130 due to excessive linear vibration of the vibrator part 200, the impact is alleviated and absorbed by the damper 140, such that vibration noise due to residual vibration is prevented.

In addition, the vibrator part 200 according to the first preferred embodiment of the present invention includes a coil 210, a printed circuit board 220, a yoke 230, a weight body 240, and an elastic member 250.

The coil 210 includes a hollow hole 211 larger than an outer peripheral surface of the magnet 110 to thereby receive the magnet 110 in the hollow hole 211 so as to be insertable thereinto.

More specifically, the coil 210 may have an annular shape in which it includes the hollow hole 211 and has an inner diameter larger than an outer diameter of the magnet 110 in order to move linearly along an outer peripheral surface of the magnet 110 in a length direction.

The printed circuit board 220 has one end coupled to the stator part 100 and the other end electrically coupled to a lower portion of the coil 210.

More specifically, the printed circuit board 220 includes a coupling plate 221, an elastic part 223, and a contact part 225.

The coupling plate 221 is coupled to the extension part 131 of the bracket 130 configuring the stator part 100 and includes a power supplying pad 222 formed thereon in order to receive power from an external set component.

In addition, the elastic part 223 is formed to be extended from the coupling plate 221 in a spiral direction so that the printed circuit board 220 has elastic force.

More specifically, the elastic part 223 formed to be extended in the spiral direction may have an inner diameter larger than the outer diameter of the magnet 110.

Therefore, generation of disconnection due to contact between the magnet 110 and the printed circuit board 220 may be prevented.

In addition, the contact part 225 is provided at one end of the elastic part 223 and is coupled to the lower portion of the coil 210 configuring the vibrator part 200 to apply external power to the coil 210.

Therefore, as shown in FIG. 2, the printed circuit board 220 is formed to be extended along a circumference of the magnet 110 in the length direction without contacting the outer peripheral surface of the magnet 110 to thereby be coupled to the coil 210.

In addition, the printed circuit board 220 may be vertically deformed according to linear vibration of the vibrator part 200, such that it does not have an effect on driving characteristics of the vibrator part 200.

Further, since the printed circuit board 220 has an inner diameter larger than the outer diameter of the magnet 110, in the case in which the printed circuit board 220 is vertically deformed, the contact between the printed circuit board 220 and the magnet 110 is prevented in advanced, thereby making it possible to prevent a damage of the linear vibration motor due to a short-circuit phenomenon.

The yoke 230 is coupled to an outer peripheral surface of the coil 210 and has an upper portion 232 coupled to a lower plate portion of the elastic member 250.

In addition, the yoke 230 is provided with a hollow hole 231 corresponding to the hollow hole 211 of the coil 210 to thereby receive the magnet 110 in the hollow hole 231 so as to be insertable thereinto.

The weight body 240 is provided with a hollow hole 241 receiving the yoke 230 therein to thereby be coupled to an outer peripheral surface of the yoke 230, wherein the yoke 230 is coupled integrally to the coil 210.

In addition, the weight body 240 is coupled to an upper portion of the contact part 213 of the printed circuit board 210 to thereby linearly move integrally with the printed circuit board 210.

Therefore, the coil 210, the yoke 230, and the weight body 240 that configure the vibrator part 200 move linearly along the outer peripheral surface of the magnet 110 in the length direction.

The elastic member 250 is to elastically support linear vibration of the vibrator part 200.

In addition, the elastic member 250 has an upper plate part 251 coupled to the upper surface of the inner side of the case 120 configuring the stator part 100 and a lower plate part 253 coupled to the upper portion 232 of the yoke 230 configuring the vibrator part 200.

More specifically, the elastic member 250, which has a leaf spring shape, includes the upper plate part 251, the lower plate part 253, and a plurality of bending parts 255.

In addition, the upper plate part 251 is fixedly coupled to the upper surface of the inner side of the case 130 configuring the stator part 100.

Further, the lower plate part 253 is fixedly coupled to the upper portion 232 of the yoke 230 configuring the vibrator part 200.

In addition, the plurality of bending parts 255 serves as a driving part of the elastic member 250.

More specifically, the bending part 255 is formed to be extended from the upper plate part 251 up to the lower plate part 253 in the spiral direction by having one end connected to the upper plate part 251 and the other end connected to the lower plate part 253 in order to generate elastic force.

Therefore, the elastic member 250 elastically supports the linear vibration generated in the vibrator part 200 by electromagnetic interaction between the magnet 110 and the coil 210.

In addition, the elastic member 250 is provided with a hollow hole 257 so that the magnet 110 is positioned therein.

More specifically, since the elastic member 250 elastically supports the linear vibration of the vibrator part 200, the elastic member 250 is provided with the hollow part 257 larger than the outer diameter of the magnet 110 so as not to contact the magnet 110 mounted on the upper surface of the inner side of the case 120 to thereby receive the magnet 110 in the hollow part 257 as to be insertable thereinto.

The linear vibration motor according to the first preferred embodiment of the present invention is driven as follows.

First, as shown in FIG. 1, power is applied to the printed circuit board 220 coupled to the upper portion of the bracket 130 and connected to the external set component.

Therefore, the power is applied to the coil 210 connected to the contact part 225 of the printed circuit board 220 to induce a magnetic field in the coil 210, such that electromagnetic force is generated between the magnet 110 coupled to the upper surface of the inner side of the case 120 and the coil 210.

Then, the vibrator part 200 including the coil 210 and the weight body 240 linearly moves in a vertical direction to generate vibration, and the elastic member 250 elastically supports the vibrator part 220 that vibrates linearly.

<Second Preferred Embodiment>

Figure 3:
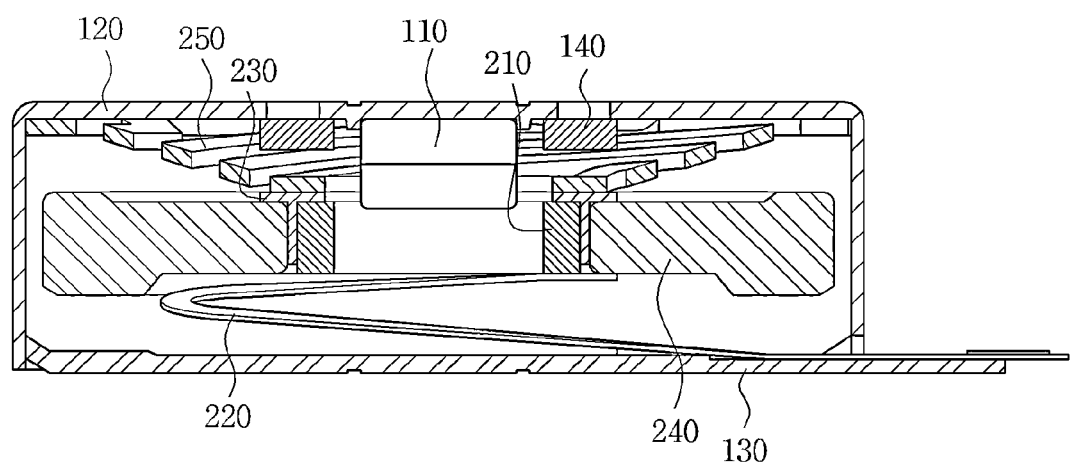
FIG. 3 is a cross sectional view showing an assembled state of a linear vibration motor according to a second preferred embodiment of the present invention.

FIG. 3 is a cross sectional view showing an assembled state of a linear vibration motor according to a second preferred embodiment of the present invention. In describing the present embodiment, components that are the same as or corresponding to components of the above-mentioned preferred embodiment will be denoted by the same reference numerals and a description of the overlapped portions will be omitted. Hereinafter, the linear vibration motor according to the second preferred embodiment of the present invention will be described with reference to FIG. 3.

The linear vibration motor according to the second preferred embodiment of the present invention includes a stator part 100 and a vibrator part 200.

More specifically, the stator part 100 includes a magnet 110, a case 120, a bracket 130, and a o damper 140, and the vibrator part 200 includes a coil 210, a printed circuit board 220, a yoke 230, a weight body 240, and an elastic member 250.

As shown in FIG. 3, the damper 140 made of a rubber material having lower density in order to alleviate and absorb impact at the time of contact with the vibrator part 200 is fixedly coupled to an upper surface of an inner side of the case 120.

Therefore, in the case in which the elastic member 250 contacts the upper surface of the inner side of the case 120 due to excessive linear vibration of the vibrator part 200, the impact is alleviated and absorbed by the damper 140, such that vibration noise due to residual vibration is prevented.

As set forth above, the linear vibration motor according to the preferred embodiments of the present invention includes the damper mounted at a position facing the vibrator part, thereby making it possible to prevent the vibration noise due to the residual vibration generated in the case in which the vibrator part contacts the bracket or the case configuring the stator part.

In addition, it is possible to prevent a damage of the vibrator part by the damper even in the case in which the vibrator part contacts the bracket or the case.

Although the preferred embodiments of the present invention have been disclosed for illustrative purposes, they are for specifically explaining the present invention and thus a linear vibration motor according to the present invention is not limited thereto, but those skilled in the art will appreciate that various modifications, additions and substitutions are possible, without departing from the scope and spirit of the invention as disclosed in the accompanying claims.

Accordingly, any and all modifications, variations or equivalent arrangements should be considered to be within the scope of the invention, and the detailed scope of the invention will be disclosed by the accompanying claims.

What is claimed is:

1. A linear vibration motor comprising:
   a stator part including a magnet;
   a vibrator part including a coil facing the magnet to generate electromagnetic force and a printed circuit board having one end coupled to the stator part and the other end coupled to the coil; and
   an elastic member connecting the stator part and the vibrator part to each other,
   wherein the stator part further includes:
      a damper facing the vibrator part;
      a case having an internal space formed therein so as to cover the vibrator part; and
      a bracket coupled to a lower portion of the case and having an extension part coupled to one end of the printed circuit board, and
   wherein the magnet is coupled to an upper surface of an inner side of the case, and the damper is coupled to the bracket, on the opposite side of the magnet, and is located opposite to the vibrator part.

2. The linear vibration motor as set forth in claim 1, wherein the damper is made of a rubber material having lower density in order to alleviate and absorb impact at the time of contact with the vibrator part.

3. The linear vibration motor as set forth in claim 1, wherein the damper is coupled to the upper surface of the inner side of the case, and the magnet is coupled to the upper surface of the inner side of the case while penetrating through a hollow hole formed in the damper.

4. The linear vibration motor as set forth in claim 1, wherein the vibrator part includes:
   a yoke coupled to an outer peripheral surface of the coil; and
   a weight body provided with a hollow hole receiving the yoke and the coil therein to thereby be coupled to an outer peripheral surface of the yoke, and wherein the coil is coupled to the other end of the printed circuit board.

5. The linear vibration motor as set forth in claim 1, wherein the printed circuit board includes:
   a coupling plate fixedly coupled to the stator part;
   an elastic part extended from the coupling plate in a spiral direction so as to have elastic force; and
   a contact part provided at one end of the elastic part and coupled to the coil of the vibrator part to apply external power to the coil.

6. The linear vibration motor as set forth in claim 1, wherein the elastic member includes:
   an upper plate part fixedly coupled to an upper surface of an inner side of the stator part;

a lower plate part fixedly coupled to an upper portion of the vibrator part; and a plurality of bending parts connecting the upper plate part and the lower plate part to each other and generating elastic force, and elastically supports linear movement of the vibrator part.

7. The linear vibration motor as set forth in claim 6, wherein the elastic member is provided with a hollow part larger than an outer diameter of the magnet so that the magnet is positioned therein, since the elastic member elastically supports the linear vibration of the vibrator part.

* * * * *